US010710919B2

(12) United States Patent
Ravel et al.

(10) Patent No.: US 10,710,919 B2
(45) Date of Patent: Jul. 14, 2020

(54) FACILITY AND METHOD FOR MANUFACTURING A HOLLOW GLASS ARTICLE

(71) Applicant: POCHET DU COURVAL, Paris (FR)

(72) Inventors: Patrick Roger Omer Ravel, Eaucourt sur Somme (FR); Fabrice Mallard, Senarpont (FR); Philippe Maloigne, Beaucamps le Vieux (FR)

(73) Assignee: POCHET DU COURVAL, Paris (FR)

( * ) Notice: Subject to any disclaimer, the term of this patent is extended or adjusted under 35 U.S.C. 154(b) by 926 days.

(21) Appl. No.: 14/468,814

(22) Filed: Aug. 26, 2014

(65) Prior Publication Data

US 2015/0059409 A1 Mar. 5, 2015

(30) Foreign Application Priority Data

Sep. 5, 2013 (FR) ...................................... 13 58523

(51) Int. Cl.
*C03B 9/31* (2006.01)
*C03B 9/36* (2006.01)
(Continued)

(52) U.S. Cl.
CPC .............. *C03B 9/31* (2013.01); *C03B 9/3609* (2013.01); *C03B 9/3627* (2013.01);
(Continued)

(58) Field of Classification Search
None
See application file for complete search history.

(56) References Cited

U.S. PATENT DOCUMENTS

| 3,337,321 A | 8/1967 | Morgan et al. |
| 5,827,469 A * | 10/1998 | Shimizu ..................... B05C 3/09 |
| | | 264/512 |
| 2008/0196627 A1* | 8/2008 | Sproson .................... C03C 8/14 |
| | | 106/287.34 |

FOREIGN PATENT DOCUMENTS

| CN | 1139041 A | 1/1997 |
| DE | 20 2012 001 064 | 8/2012 |

(Continued)

OTHER PUBLICATIONS

JP2006-016263 A Machine Translation Performed by JPO Jun. 10, 2016 EST.*

(Continued)

*Primary Examiner* — Lisa L Herring
(74) *Attorney, Agent, or Firm* — Davidson, Davidson & Kappel, LLC

(57) ABSTRACT

A facility for manufacturing a hollow glass article, including: a finishing mold intended to receive a blank of the hollow glass article and defining a cavity for forming the hollow glass article, at least one gas source, and a blowing head connected to the gas source and adapted for achieving at least one injection of the gas into the inside of the blank contained in the cavity. The facility further includes: at least one reservoir of coloring powder, and a system for injecting the coloring powder into the inside of the blank while the blank is located in the finishing mold and into the inside of the hollow glass article while the hollow glass article is located in the finishing mold, so that the injection of the coloring powder takes place before, during, after, before and during, during and after, or before, during and after the gas injection.

9 Claims, 2 Drawing Sheets

(51) Int. Cl.
  *C03C 17/00* (2006.01)
  *C03C 17/04* (2006.01)
(52) U.S. Cl.
  CPC .......... *C03B 9/3663* (2013.01); *C03C 17/004* (2013.01); *C03C 17/04* (2013.01); *C03C 2217/72* (2013.01); *Y02P 40/57* (2015.11)

(56) References Cited

FOREIGN PATENT DOCUMENTS

FR 2889485 A1 * 2/2007 ............... B05D 1/04
JP 2006016263 1/2006

OTHER PUBLICATIONS

English Translation of JP2006-016263, Performed by FLS, Inc. Jun. 2016.*
FR2889485A1 Google Machine Translation Performed Jul. 11, 2019. (Year: 2019).*
FR2889485A1 English Translation Performed by LinguaLinx Language Solutions, Inc. Jul. 2019. (Year: 2019).*
Cheung et al., Aerosol Sampler Calibration, ACGIH,Inc., pp. 12-14, 2008. (Year: 2008).*
Database WPI, Week 200608, Thomson Scientific, London, GB.

* cited by examiner

FACILITY AND METHOD FOR MANUFACTURING A HOLLOW GLASS ARTICLE

This claims the benefit of French Patent Application FR 13 585 23, filed Sep. 5, 2013 and hereby incorporated by reference herein.

The present invention relates to a facility for manufacturing a hollow glass article, the facility including:

a finishing mold intended to receive a blank of the hollow glass article, the finishing mold defining a cavity for forming the hollow glass article from the blank, at least one gas source, and a blowing head connected to the gas source and adapted for producing at least one injection of gas inside the blank contained in the cavity.

The invention also relates to the corresponding method.

The article is for example a flask or a pot.

BACKGROUND

A known method for manufacturing this type of articles consists of introducing into a blank mold at least one glass parison melted at a determined temperature and of pre-forming in the blank mold the article from the parison by injecting into the blank mold pressurized gas, for example air.

The blank of the thereby produced article is transferred into a finishing mold and the article is definitively formed in this finishing mold by also injecting pressurized gas.

In order to decorate the article, colored lacquering is sometimes applied inside or outside the article or both. After having removed the article from the finishing mold and having left it to cool sufficiently, a coloring composition is applied onto the inner or outer surface of the article and heat treatment is performed to finalize the lacquering and obtain the lacquered article.

Such a method for manufacturing the article gives satisfaction from the point of view of the quality of the obtained article. However, because of its duration, it is relatively not very productive and therefore expensive.

SUMMARY OF THE INVENTION

It is an object of the present invention to provide a facility for manufacturing a hollow glass article having interior coloration, the facility having improved productivity as compared with a conventional facility.

The present invention provides a facility for manufacturing a hollow glass article of the type described above, further comprising:

at least one reservoir of coloring powder, and a system capable of injecting the coloring powder into the inside of the blank while the blank is located in the finishing mold and into the inside of the hollow glass article while the hollow glass article is located in the finishing mold, the system being configured so that the injection of the coloring powder occurs before, during, after, before and during, during and after, or before and during and after the gas injection.

According to particular embodiments, the printing machine comprises one or more of the following features, taken individually or according to all the technically possible combinations:

the system is configured so that the injection of the coloring powder and the injection of gas are substantially simultaneous;

the system comprises: a gas duct capable of conveying the gas from the gas source to as far as the blowing head, and a coloring powder duct connecting the reservoir to the gas duct, the coloring powder duct and the gas duct being adapted so as to mix the coloring powder with the gas prior to injecting the gas;

the gas duct comprises a constriction into which the coloring powder duct opens, the constriction being adapted for sucking up the coloring powder and mixing the coloring powder with the gas by the Venturi effect;

the coloring powder duct includes an anti-return valve;

the coloring powder duct includes an obturating valve, the opening of which is controllable, and the facility further comprises control means capable of synchronizing the obturating valve with the injection of the gas;

the blowing head includes a body defining a blowing face intended to be turned towards the finishing mold during the injection of the gas, and at least one nozzle protruding from the blowing face inside the blank during the injection of the gas, the nozzle being intended for conveying the gas and releasing it inside the blank;

the nozzle is mounted so as to be movable on the body in order to change position relatively to the blank;

the blowing head comprises an exhaust system suitable for allowing escape into the open air of at least one portion of the injected gas inside the blank.

The invention also relates to a method for manufacturing a hollow glass article including at least the following steps:

receiving a blank of the hollow glass article in a finishing mold, the finishing mold defining a cavity for forming the hollow glass article from the blank, and carrying out at least one injection of a gas into the inside of the blank contained in the cavity by means of a blowing head, the gas stemming from at least one gas source connected to the blowing head, the method further comprising a step for injecting a coloring powder into the inside of the blank, the blank being received in the finishing mold, or for injection into the inside of the hollow glass article while the hollow glass article is located in the finishing mold, the coloring powder stemming from at least one reservoir, the injection of the coloring powder taking place before, during, after, before and during, during and after, or before and during and after the gas injection.

According to a particular embodiment, the method comprises the feature according to which the injection of the coloring powder and the injection of gas are substantially simultaneous.

BRIEF DESCRIPTION OF THE DRAWINGS

The invention will be better understood upon reading the description which follows, only given as example and made with reference to the appended drawings, wherein.

DETAILED DESCRIPTION

Figure 1:
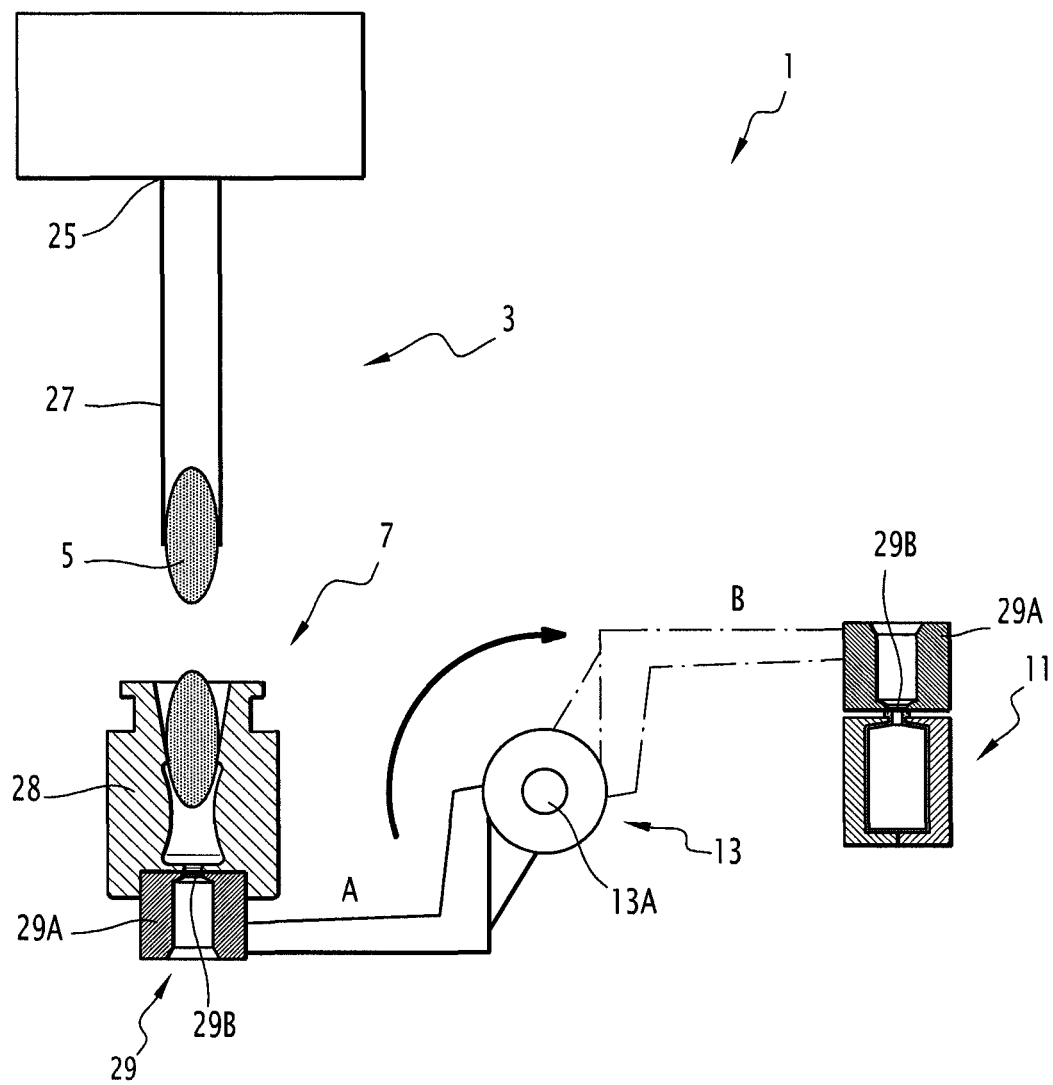
FIG. 1 is a schematic view of a portion of a facility for manufacturing a hollow glass article according to the invention.
Figure 2:
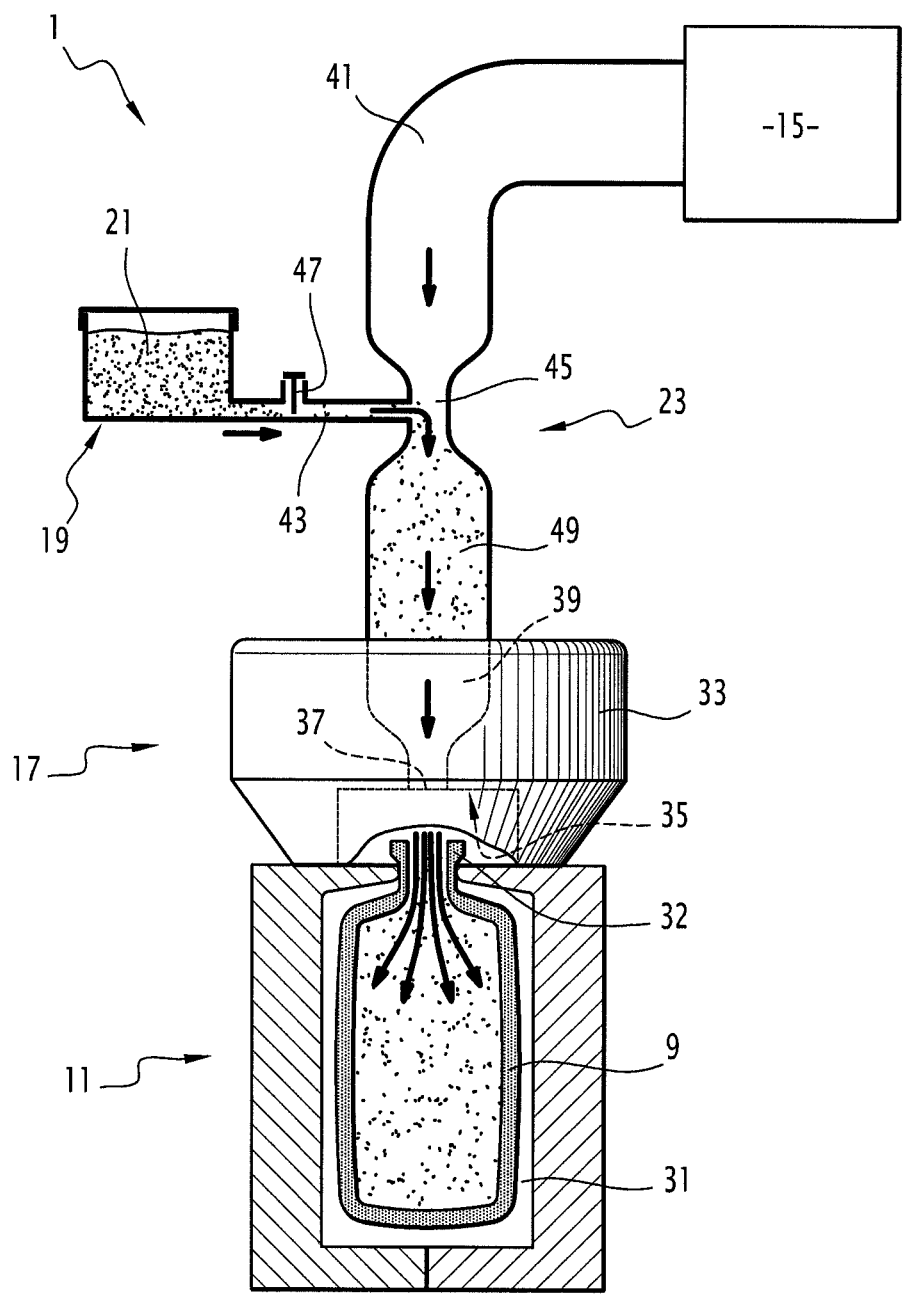
FIG. 2 is a schematic view of another portion of the facility partly illustrated in FIG. 1.

With reference to FIGS. 1 and 2, a facility 1 for manufacturing a hollow glass article is described.

As visible in FIG. 1, the facility 1 comprises a glass dispenser 3 intended to deliver a parison 5, a blank mold 7 for transforming the parison 5 into a blank 9 (FIG. 2) of the hollow glass article, a finishing mold 11 for forming the hollow glass article from the blank 9, and a transfer arm 13 for transferring the blank 9 from the blank mold 7 to the finishing mold 11.

As visible in FIG. 2, the facility 1 further includes a gas source 15, a blowing head 17 connected to the gas source, a reservoir 19 containing a coloring powder 21, and a system 23 capable of injecting the coloring powder 21 into the inside of the blank 9 when the blank is received in the finishing mold 11.

The dispenser 3 is located between an oven for glass (not shown) and the blank mold 7. The dispenser 3, of a type known per se, includes a pouring orifice 25 and a conduit 27.

The blank mold 7, also of a type known per se, includes a body 28, and an assembly 29 connected to a device (not shown) for supplying pressurized gas, for example air.

The body 28 defines a cavity for the blank 9.

The assembly 29 is known per se. It comprises a ring mold 29A, a washer 29B, and a punch.

The ring mold 29A and the washer 29B are attached on the transfer arm 13.

The transfer arm 13 is mounted so as to be movable around an axis 13A, for example a horizontal axis, between a first position A in which the ring mold 29A and the washer 29B are applied under the body 28 of the blank mold 7, and a second position B in which the ring mold 29A and the washer 29B are located in the vicinity of the finishing mold 11.

The blank 9 includes a ring 32 formed by the ring mold 29A and the washer 29B and adapted so that the blank 9 remains secured to the ring mold and the washer when the transfer arm 13 passes from the position A to the position B.

The finishing mold 11 (FIG. 2) is of a type known per se. It defines a cavity 31 adapted for forming the hollow glass article.

The blowing head 17 is adapted so as to perform at least one injection of the gas into the inside of the blank 9 in order to form the hollow glass article against the cavity 31.

The blowing head 17 includes a body 33 defining a blowing face 35 turned towards the finishing mold 11 during the injection of the gas, and a nozzle 37 capable of conveying the gas and of releasing it inside the blank 9.

The blowing head 17 further defines an internal conduit 39 capable of conveying the injected gas.

According to an alternative, the blowing head 17 also includes an exhaust system adapted for allowing escape into the open air of at least one portion of the injected gas inside the blank 9.

In the illustrated example, the nozzle 37 is an orifice made in the blowing face 35.

According to another embodiment, the nozzle 37 protrudes from the blowing face 35 towards the blank 9 preferably towards the inside thereof, during injection of the gas.

According to a particular embodiment of this alternative, the nozzle 37 is mounted so as to be movable on the body 33 relatively to the finishing mold 11. The nozzle 37 is capable of being actuated in translation or in rotation, or both, relatively to the blank 9.

The gas source 15 is for example a source of compressed air.

The coloring powder 21 is capable of reacting with the blank 9 in order to form an inner decoration layer.

The coloring powder 21 is capable of adhering to the glass between 400° C. and 1,300° C.

The coloring powder 21 advantageously has a composition close to that of the glass of the blank 9.

The coloring powder 21 advantageously has a thermal expansion coefficient close to that of the glass of the blank 9. Advantageously, the thermal expansion coefficient of the particles of the coloring powder 21, for example measured at 20° C., is comprised between 70% and 130%, preferably between 80% and 120%, of that of the glass of the hollow article measured under the same conditions.

According to a first example, the coloring powder 21 is obtained by milling a frit, i.e. a glassy material comprising at least 50% by mass of silica and containing one or several metal oxides. From among these oxides, at least one of them lies at the origin of the color of the powder, and subsequently of the color of the inner decoration layer. The thermal expansion coefficient of the coloring powder 21 is then advantageously comprised between 100% and 130% of that of the glass of the hollow article measured under the same conditions.

The average diameter of the particles of the coloring powder 21 is then for example comprised between 20 and 50 µm.

According to a second example, the coloring powder 21 is obtained by milling granules comprising an organic phase and a glassy phase including at least 50% by mass of silica and containing one or several metal oxides.

The average diameter of the particles of the coloring powder 21 is then for example comprised between 120 and 300 µm.

According to a third example, the coloring powder 21 consists of one or several, advantageously pure, metal oxides at 99.5% by mass.

Erbium oxide is an example of a metal oxide giving the inner decoration layer a pink color.

According to a fourth example, the coloring powder 21 is obtained by milling enamels which comprise an inorganic portion for example containing several metal oxides giving its hue to the enamel, and an organic portion called a medium. The mass fraction of the organic phase varies according to the type of enamel, is generally between about 10% and 25%. The thermal expansion coefficient of the coloring powder 21 is then advantageously comprised between 70% and 100% of that of the glass of the hollow article measured under the same conditions.

According to a fifth example, the coloring powder 21 is a glass powder advantageously obtained by milling glass similar to that of the hollow glass article, except that this glass is colored. Thus the composition of the coloring powder 21 is very close to that of the glass of the hollow glass article. The thermal expansion coefficient of the coloring powder 21 is then advantageously substantially equal to that of the glass of the hollow article measured under the same conditions.

The coloring powders given above as an example may be used in a mixture in varied proportions.

The inner decoration layer is capable of modifying the color of the hollow glass article as perceived by a user.

The inner decoration layer is advantageously adapted so as not to modify the physical-chemical and mechanical properties of the glass making up the blank 9. For example, the inner decoration layer has a thermomechanical behavior close to that of glass.

The inner decoration layer is advantageously adapted so as to form a barrier against a migration of chemical species towards a product, for example a perfume, intended to be contained in the hollow glass article. For example the inner decoration layer is adapted for preventing migration of chemical species which may alter the fragrance or the preservation of the product.

In the illustrated example, the system 23 is configured so that the injection of the coloring powder 21 takes place during the injection of the gas.

According to an alternative not shown, the system 23 is configured so that the injection of the coloring powder 21 takes place at least partly before the injection of the gas.

The system 23 comprises a gas duct 41 capable of conveying the gas from the gas source 15 to as far as the blowing head 17, and a coloring powder duct 43 connecting the reservoir 19 to the gas duct.

The coloring powder duct 43 and the gas duct 41 are adapted for mixing the coloring powder 21 with the gas prior to injecting the gas.

According to an alternative not shown, the coloring powder duct 43 connects the reservoir 19 to the blowing head 17. The coloring powder duct 43 and the blowing head 17 are then adapted for mixing the coloring powder 21 with the gas prior to injecting the gas.

The gas duct 41 includes a constriction 45 into which the coloring powder duct 43 opens.

The powder duct 43 includes an anti-return valve 47 capable of preventing backflow of the coloring powder 21 from the gas duct 41 to the reservoir 19.

The constriction 45 is adapted so as to suck up the coloring powder 21 and mixes it with the gas by the Venturi effect.

According to an alternative not shown, the coloring powder duct 43 comprises an obturation valve, the opening of which is controllable. The facility 1 then comprises control means capable of synchronizing the obturation valve with the injection of gas. The injection of the gas for example lasts for at least one second.

The operation of the facility 1 will now be described.

As visible in FIG. 1, the dispenser 3 delivers the parison 5 at the outlet of the pouring orifice 25. The parison 5 falls via the conduit 27 into the blank mold 7. The transfer arm 13 is then in the position A.

In a way known per se, the blowing nozzle 29 produces several injections of air into the blank mold 7 in order to transform the parison 5 into the blank 9 as schematically illustrated in FIG. 2.

The transfer arm 13 then passes from the position A to the position B (FIG. 1). The blank 9 remains secured to the ring mold 29A and to the washer 29B through its ring 32 and is moved towards the finishing mold 11 (FIGS. 1 and 2). The blank 9 is received in the finishing mold 11.

In order to form the hollow glass article from the blank 9, an injection of pressurized gas into the inside of the blank 9 is carried out (FIG. 2). The gas, air in the illustrated example, stemming from the gas source 15 follows the gas duct 41 as far as the blowing head 17. Upon passing into the constriction 45, the gas is subject to a Venturi effect, i.e. a depression is created in the gas at the constriction.

The coloring powder 21 located in the reservoir 19 follows the coloring powder duct 43 before being sucked into the constriction 45 because of the depression. The anti-return valve 47 avoids backflow of the gas and of the coloring power 21 towards the reservoir 19. The sucked-up coloring powder 21 mixes with the gas in order to form a mixture 49 of gas and of coloring powder.

The mixture 49 arrives at the blowing head 17. The mixture 49 crosses the latter via the inner conduit 39 and is ejected into the blank 9 through the nozzle 37.

It is understood that the injection of the coloring powder 21 and the injection of the gas are substantially simultaneous in the illustrated example. By <<substantially simultaneous>>, is meant that the beginning of the injection of the coloring powder 21 occurs less than $^{1}\!/_{10}{}^{th}$ of a second after the beginning of the gas injection and that the end of the injection of the coloring powder occurs less than $^{1}\!/_{10}{}^{th}$ of a second before the end of the gas injection.

Advantageously, the injection of the coloring powder 21 is carried out for a time period comprised between 0 and 10 seconds.

Alternatively, the injection of the coloring powder 21 begins after the beginning of the injection of the gas.

According to another alternative, the injection of the coloring powder is interrupted before the end of the injection of the gas.

According to another alternative, the powder injection continues after the end of the gas injection.

In other embodiments, the previous alternatives are combined according to all the technically possible combinations. Thus, the injection of the coloring powder 21 takes place:
- before,
- during,
- after,
- before and during,
- during and after, or
- before and during and after injection of the gas used for forming the hollow glass article from the blank 9.

Depending on the moment when the coloring powder 21 is injected, the coloring powder is injected into what is still only the blank 9, or else what has already become the hollow glass article. In any case, upon injection of the coloring powder 21, the blank 9 and if need be, the hollow glass article, are still in the finishing mold 11.

The blank 9 swells in the cavity 31 of the finishing mold 11 in order to form the hollow glass article. The coloring powder 21 injected into the blank 9 adheres to the glass inside the blank in order to form the inner decoration layer.

The inner decoration layer may assume an aspect from among a plurality of aspects. According to an embodiment, the inner decoration layer forms a pattern inside the hollow glass article, for example a spiral pattern.

The facility 1 is for example configured so that the coloring powder 21 is deposited on the blank 9 while the inside of the blank has a surface temperature comprised between 600° C. and 1,300° C.

By means of the features described above, the inner coloration of the hollow glass article is achieved under hot conditions during the forming of the hollow glass article in the finishing mold 11. The result of this is a gain in time in the manufacturing. Thus, the facility 1 has improved productivity with respect to a conventional facility producing cold lacquering after the forming.

The facility 1 further allows good control of the inner distribution of the glass during the forming and of the quality of the glass of the hollow glass article.

What is claimed is:

1. A method for manufacturing a hollow glass article including at least the following steps:
    receiving a blank of the hollow glass article in a finishing mold, the finishing mold defining a cavity for forming the hollow glass article from the blank;
    achieving at least one injection of a gas into the inside of the blank contained in the cavity via a blowing head, the gas stemming from at least one gas source connected to the blowing head; and
    injecting a coloring powder into the inside of the blank, the blank being received in the finishing mold, or injecting the coloring powder into the inside of the hollow glass article while the hollow glass article is located in the finishing mold, the coloring powder stemming from at least one reservoir, the injection of the coloring powder taking place before, during, after, before and during, during and after, or before and during and after the gas injection;

conveying said gas from said at least one gas source via a gas duct to the blowing head; and conveying said coloring powder via a coloring powder duct from said at least one reservoir to the gas duct, the coloring powder duct extending from the at least one reservoir to the gas duct and having an anti-return valve, the coloring powder duct and the gas duct being adapted for mixing the coloring powder with the gas prior to the at least one injection of the gas, wherein the gas duct comprises a constriction into which the coloring powder duct opens, the constriction being adapted for sucking up the coloring powder and mixing the coloring powder with the gas by a Venturi effect, wherein the at least one reservoir and the anti-return valve are configured so that a bed of the coloring powder extends from the at least one reservoir to the anti-return valve in the coloring powder duct.

2. The method according to claim 1, wherein the injection of the coloring powder and the gas injection are substantially simultaneous.

3. The method according to claim 1, wherein the coloring powder duct extends horizontally and the bed of the coloring powder flows horizontally in the coloring powder duct from the at least one reservoir through the anti-return valve to the gas duct.

4. The method according to claim 3, wherein the gas duct includes a vertically extending portion including the constriction, the coloring powder duct intersecting the constriction of the gas duct at the vertically extending portion such that the coloring powder is conveyed downward by the gas at the constriction.

5. The method according to claim 4, further comprising conveying the coloring powder mixed with the gas downward into the blowing head such that a nozzle of the blowing head conveys the gas downward into the inside of the blank or into the inside of the hollow glass article.

6. The method according to claim 5, wherein the blowing head includes an inner conduit that forms a constriction of the blowing head that ends in an orifice defining the nozzle, the coloring powder mixed with the gas being forced downward by the constriction of the gas duct through the constriction of the blowing head and out of the orifice.

7. The method according to claim 6, wherein the nozzle of the blowing head conveys the gas downward into the inside of the blank and the blank includes a ring at a top end of the blank, the coloring powder mixed with the gas being forced downward through the ring and into the inside of the blank.

8. The method according to claim 1 wherein the injection of the coloring powder and the injection of the gas are substantially simultaneous, meaning that a beginning of the injection of the coloring powder occurs less than $1/10^{th}$ of a second after a beginning of the injection of gas and that an end of the injection of the coloring powder occurs less than $1/10^{th}$ of a second before an end of the injection of the gas.

9. The method according to claim 1, wherein the injection of the coloring powder is carried out for a time period comprised between 0 and 10 seconds.

* * * * *